(12) United States Patent
Werner et al.

(10) Patent No.: US 9,539,855 B2
(45) Date of Patent: Jan. 10, 2017

(54) RIM WELL WITH INTEGRATED FLANGE MADE OF FIBER COMPOSITES AS WELL AS METHOD FOR MANUFACTURING SAME

(71) Applicant: THYSSENKRUPP CARBON COMPONENTS GMBH, Kesselsdorf (DE)

(72) Inventors: Jens Werner, Coswig (DE); Christian Köhler, Dresden (DE); André Bartsch, Dresden (DE); Sandro Mäke, Dohma (DE); Michael Dreβler, Dresden (DE); Martin Lepper, Dresden (DE); Werner Hufenbach, Dresden (DE)

(73) Assignee: THYSSENKRUPP CARBON COMPONENTS GMBH, Kesselsdorf (DE)

( * ) Notice: Subject to any disclaimer, the term of this patent is extended or adjusted under 35 U.S.C. 154(b) by 112 days.

(21) Appl. No.: 14/363,036

(22) PCT Filed: Dec. 3, 2012

(86) PCT No.: PCT/EP2012/074187
§ 371 (c)(1),
(2) Date: Jun. 5, 2014

(87) PCT Pub. No.: WO2013/083502
PCT Pub. Date: Jun. 13, 2013

(65) Prior Publication Data
US 2014/0333122 A1    Nov. 13, 2014

(30) Foreign Application Priority Data
Dec. 7, 2011 (DE) .......... 10 2011 087 921

(51) Int. Cl.
*B60B 3/02* (2006.01)
*B60B 5/02* (2006.01)
(Continued)

(52) U.S. Cl.
CPC ............... *B60B 5/02* (2013.01); *B29C 70/021* (2013.01); *B29C 70/34* (2013.01); *B29L 2031/32* (2013.01);
(Continued)

(58) Field of Classification Search
CPC ............ B60B 3/02; B60B 5/02; B60B 21/104; B60B 21/106
See application file for complete search history.

(56) References Cited

U.S. PATENT DOCUMENTS 3,917,352 A    11/1975  Gageby
4,479,235 A *  10/1984  Griffis ................. H04S 5/00
                                                            348/485

(Continued)

FOREIGN PATENT DOCUMENTS

DE        41 23 459 C1     11/1992
DE   20 2005 004399 U1      6/2005
(Continued)

OTHER PUBLICATIONS

Chinese Office Action of Sep. 25, 2015.

Primary Examiner — John Walters
Assistant Examiner — James Triggs
(74) Attorney, Agent, or Firm — McGlew and Tuttle, P.C.

(57) ABSTRACT

A rim well with integrated flange made of fiber composite as well as to a method for manufacturing same. The flange is formed by inwardly directed protuberances of fiber layers of the rim well, wherein the fiber layers transition to the flange from the rim well without interruption of the fibers. The manufacture is carried out by depositing fiber material on a mold, which corresponds to the contour of the rim well and has a radially circumferential or segmented groove. The fibers are deposited such that the fibers of at least one fiber layer have protuberances directed into the groove. A multi-
(Continued)

part mold, which makes it possible to reduce the width of the groove and thus a deformation of the protuberances, is preferably used.

23 Claims, 9 Drawing Sheets

(51) Int. Cl.
   *B29C 70/34*      (2006.01)
   *B29C 70/02*      (2006.01)
   *B29L 31/32*      (2006.01)
   *B60B 25/00*      (2006.01)
(52) U.S. Cl.
   CPC ............ *B60B 25/002* (2013.01); *B60B 25/008* (2013.01); *B60B 2310/241* (2013.01); *B60B 2360/34* (2013.01); *B60B 2360/36* (2013.01); *B60B 2900/551* (2013.01)

(56) References Cited

U.S. PATENT DOCUMENTS

| | | |
|---|---|---|
| 4,483,729 A | 11/1984 | Fujisaki et al. |
| 4,749,235 A | 6/1988 | McDougall |
| 5,282,673 A | 2/1994 | Koyama et al. |
| 2005/0121970 A1 | 6/2005 | Adrian |

FOREIGN PATENT DOCUMENTS

| | | |
|---|---|---|
| DE | 10 2005 041940 A1 | 3/2007 |
| DE | 10 2007 045108 A1 | 4/2009 |
| DE | 42 23 290 B4 | 5/2011 |
| DE | 10 2010 010512 A1 | 9/2011 |
| DE | 10 2010 010513 A1 | 9/2011 |
| EP | 2 363 273 A1 | 9/2011 |
| JP | 59 032504 A | 2/1984 |

\* cited by examiner

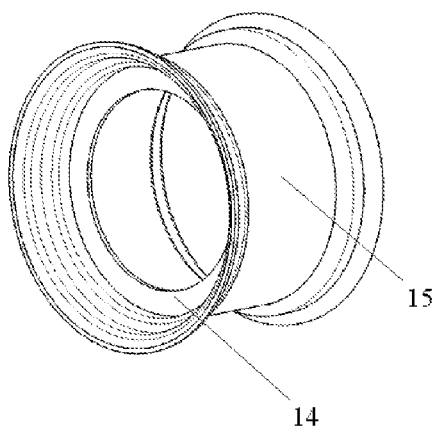 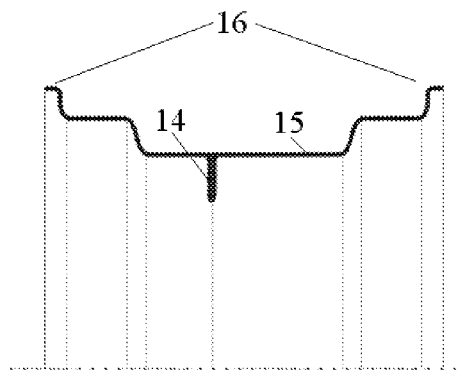
Fig. 5            Fig. 6
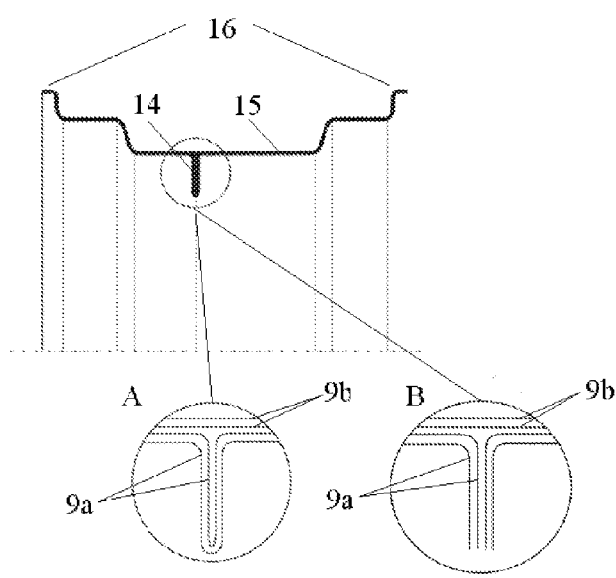
Fig. 7

RIM WELL WITH INTEGRATED FLANGE MADE OF FIBER COMPOSITES AS WELL AS METHOD FOR MANUFACTURING SAME

CROSS REFERENCE TO RELATED APPLICATIONS

This application is a United States National Phase Application of International Application PCT/EP2012/074187 filed Dec. 3, 2012 and claims the benefit of priority under 35 U.S.C. §119 of German Patent Application DE 10 2011 087 921.8 filed Dec. 7, 2011, the entire contents of which are incorporated herein by reference.

FIELD OF THE INVENTION

The use of lightweight materials in the manufacture of vehicles, especially in the manufacture of spare parts and performance parts, is known from the state of the art. The use of light metals, such as aluminum and magnesium, for body parts and small parts has meanwhile become generally accepted in series production as well. In addition, because of their excellent ratio of weight to mechanical properties, fiber composites are gaining increasing significance. However, these composites have been used so far predominantly in the manufacture of vehicle bodies, because the manufacture of components adapted to stress, for example, rims, from fiber composites is complicated and is still the subject of current research.

BACKGROUND OF THE INVENTION

The use of fiber composites for vehicle wheels or rims leads to marked improvements in terms of the acceleration and handling of a vehicle. The reduction of the inert and unsprung mass of the wheels leads at the same time to better road holding of the vehicle as well as to a great reduction of the bearing forces and can thus lead, for example, to prolonged service life of shock absorbers, wheel suspension and strut bearings.

Lightweight vehicle wheels, which consist fully or at least partly of fiber composite, have been known from the state of the art.

DE 41 23 459 C1 discloses a vehicle wheel, comprising a plastic rim and a wheel disk consisting at least partly of metal, with which a considerable weight reduction and at the same time sufficient thermal conductivity of the wheel can be achieved compared to conventional steel rims. The inner side of the rim, which consists of a high-strength plastic with relatively high thermal conductivity, is designed between the hump and well as an ideally shaped counterpart to the wheel disk, so that these are in contact with one another in a largely positive-locking manner. In addition, an inwardly directed, continuous or interrupted edge can be arranged on the side of the well facing away from the tire for screwing on the wheel disk. According to this document, a further positive-locking connection or connection in substance may be additionally provided between the rim and the wheel disk. To facilitate the flow of material, the wheel disk and the rim are especially preferably formed from a metal-plastic composite. The use of fiber composites is not disclosed in this document.

A vehicle wheel, comprising a rim made of fiber-reinforced plastic and a wheel disk made of metal, is described in DE 20 2005 004 399 U1. The wheel disk or spokes or other connection elements are connected centrally with the rim, and these are passed centrally through the rim. This solution is said to be advantageous over a fastening of the wheel disk to an edge located on the inner side, as in DE 41 23 459 C1. This is said to be especially apply to the tires of motorcycles, because unilateral stresses greatly stressing the rim mechanically are allegedly avoided by the central fastening. In addition, the problem that no rim is allegedly able to be manufactured with uniformly fiber-reinforced edge located on the inside according to the state of the art cited is said to be thus able to be bypassed.

DE 10 2010 010 513 A1 and DE 10 2010 010 512 A1 describe methods for manufacturing hollow section-like components, especially wheel rims, from fiber composites by the braiding deposition of fibers on a mold imaging the contour of the component and subsequent consolidation of this preform with matrix material. Furthermore, it is disclosed how a second component, especially a wheel disk or wheel brace or a wheel spider, can be integrated in the preform during the fiber deposition in a positive-locking manner in order to form a firm connection with the preform by connection in substance during the subsequent consolidation. Even though a high-strength connection of the wheel disk and rim is guaranteed hereby, this connection is based on an inseparable connection of the two components and thus makes a modular design of vehicle wheels by the combination of different wheel disks and rims impossible.

U.S. Pat. No. 3,917,352 describes a vehicle wheel made of fiber-reinforced plastic wheel as well as a method for manufacturing same. The wheel is of a one-part design and comprises both rim well and wheel disk. The manufacture of the wheel is carried out by winding a fabric tube around the two halves of a mold, where the wheel disk can be formed by winding over a groove. However, the fiber deposition during winding does not take place in a sufficiently positive-locking manner, and the fabric tube must therefore be wound additionally around with fabric tape or filaments. Due to the fact that the manufacturing method is limited to one-part rims, a modular design of vehicle wheels is not possible.

DE 42 23 290 B4 discloses a composite synthetic resin wheel, which comprises a plurality of partial cast parts. The partial cast parts have corresponding threads on their connection surfaces, so that they can be fitted together by means of screw connection. This type of joining, which deviates from the industrial standard, requires the preparation of the threads already at the time of the manufacture of the partial cast parts and this greatly limits the possibility of using them. The manufacture of parts with such threads is not readily possible, moreover, without casting or injection molding methods.

Lightweight wheels made of fiber composites have hitherto been mainly niche products and are often prohibitively expensive for the regular consumer because of the small batch numbers and the high manufacturing costs. This is due especially to the fact that the manufacture of rims from fiber composites requires not only technical know-how, but also special machines and technologies, which are appearing in series production only slowly. The introduction of this technology on the mass market could, however, be substantially facilitated by modular systems, which make it possible for the various manufacturers to resort to a selection of basic elements and to individualize these elements.

SUMMARY OF THE INVENTION

An object of the present invention is to overcome the drawbacks of the state of the art and to provide a rim well with integrated flange made of fiber composite for permanent connection with a wheel disk or a wheel spider, and to provide a method for manufacturing same. This rim well shall be able to be individualized as a basic element as desired by mounting an optically attractive wheel disk on the integrated flange. The rim well shall be able to be added into a fully loadable vehicle wheel, especially a wheel for a DOT-approved vehicle.

The rim well according to the present invention consists entirely of fiber composite and has a flange on the side of the rim well facing away from the inner side and from the tire for fastening a wheel spider or a wheel disk. The rim well is limited on both sides by wheel flanges and has a wheel well between the wheel flanges, in the area of which well the rim well has the smallest circumference. The rim well may have further designs, e.g., hump or bead seat, but these are of secondary significance for the present invention. The flange may be arranged according to the present invention in the entire area of the rim well, but the flange is preferably arranged in the well of the rim.

The rim well and flange are made, preferably in one part, of a fiber composite. The fiber composite preferably consists of reinforcing fibers, which are embedded in a duroplastic or thermoplastic matrix material. One-part means here that the rim well and the flange are formed at least partly from common reinforcing fibers. Due to the presence of common reinforcing fibers in the rim well and flange, forces, especially tensile forces, are outstandingly transmitted between the rim well and the flange.

Carbon fibers, glass fibers, or aramide fibers are used as reinforcing fibers. The reinforcing fibers are arranged in fiber layers in a layered pattern in the rim well and the flange. Depending on the manufacturing method, the fiber layers may consist of braiding, fabric, knitted fabric or scrim. The fiber layers are built up especially preferably from braided or wound continuous filaments. The fiber layers formed from filaments pass over into one another at reversal points at which a change in direction of the fiber layers takes place. The reversal points are preferably located on the periphery of the rim well in the axial direction, especially at the wheel flanges.

The rim well built up in this way as a multilayer formation from fiber layers has at least one fiber layer with inwardly directed protuberance. These protuberances form, in the consolidated form, the flange used to fasten the wheel disk. The fiber layers extend according to the present invention from the rim well to the flange without interruption. Due to the fact that the flange and the rim well are formed from common fiber layers or fibers, a rim well with a flange integrated in a high-strength manner is thus formed, and the forces and torques acting on the flange are optimally transmitted to the rim well.

The fiber layers preferably enter the flange and exit the flange and have a reversal point at the lower end of the flange. A reversal of the direction of the fiber layer, especially of the fibers in the fiber layer, takes place at this point. The flange has a higher stability, especially at its lower end, compared to a multilayer sandwich construction due to the uninterrupted course of the fiber layers. Furthermore, the fiber layers are especially preferably formed from continuous filaments, so that the continuous filaments have a reversal point at the lower end of the flange. However, no fiber layers pass over into one another at this point, but rather the reversal of direction of one fiber layer takes place.

The fiber layers especially preferably pass through the entire rim well as well as the flange region without interruption. A fiber layer thus passes through the entire rim well starting from a wheel flange in the direction of the center of the rim, transitions to the flange especially without interruption and transitions from same and runs farther to the other wheel flange. Fiber layers formed from continuous filaments continue to pass over into one another at reversal points, which are located on the periphery of the rim well, especially at the axially outermost points of the rim well, the wheel flanges. A fiber layer thus passes through the entire rim well starting from a wheel flange in the direction of the center of the rim, transitions to the flange without interruption and transitions from same and extends farther to the other wheel flange. The fiber layer has a reversal point there, at which it passes over into a fiber layer that is deposited, as a rule, radially over it. This fiber layer in this case extends in the opposite direction to the center of the rim, transitions to the flange without interruption and transitions from same and extends farther to the first wheel flange.

Furthermore, some of the fiber layers preferably pass only partly through the rim well. This means that at least one fiber layer does not fully cover the rim well, especially in the axial direction. Such a fiber layer passes through a part of the rim well starting from a point between the two wheel flanges in the direction of the center of the rim. The fiber layer transitions to the flange at least without interruption, entering the flange and exiting same preferably without interruption. If the fiber layer transitions to the flange and transitions from same, it passes, starting from any desired point on one side of the flange, over part of the rim well in the direction of the flange, enters and then transitions from the flange without interruption, running to any other desired point on the other side of the flange. Fiber layers formed from continuous filaments, which pass over into one another at reversal points, will then have additional reversal points in the area of the rim well. The positioning of the reversal points of these fiber layers follows, as is to be expected, especially stressed areas of the rim well, especially in the area close to the flange. Due to the positioning of the reversal points of the fiber layers within the rim well rather than exclusively in the area of the wheel flanges, certain areas of the rim well, which are extensive in the axial direction, can be provided with more fiber layers formed from continuous filaments than the entirety of the rim well. This or the provision of parts of the rim well in some areas with fiber layers not formed from continuous filaments leads to a comparatively greater layer thickness of the fiber material in these areas. All fiber layers are integrated into a fixed system of layers due to the deposition of fiber layers with reversal points in the area of the wheel rims on the entire rim well.

The inwardly directed protuberances of the fiber layers are arranged in the rim well according to the present invention such that the flange formed therefrom is present circumferentially or in an interrupted manner in the form of individual circle segments on the inner side of the rim well. In case of individual circle segments, these may have different shapes and have, in particular, a different extension in the radial direction in order to make it thus possible, for example, to arrange wheel spiders with hollow spokes having different lengths. Variation of the contour and height of the flange along the flange circumference is also preferred in case of a continuous flange.

The fiber layers formed from fibers entering the flange and preferably from entering and exiting fibers are the flange-forming fiber layers of the rim well according to the present invention. The rim well according to the present invention preferably has at least one fiber layer, preferably at least two and also preferably at least three fiber layers. The flange-forming fiber layers are preferably a certain number of fiber layers that follow each other and are located radially inside, including the radially innermost one. The greater the number of flange-forming fiber layers, the greater is the strength of the flange formed therefrom, and the better is the introduction of forces into the rest of the rim well.

The rim well according to the present invention additionally has a layer of rim well-forming fiber layers, which are applied exclusively in the area of the rim well and have no protuberances. These layers advantageously cover or span over the protuberances of the flange-forming fiber layers and thus ensure an uninterrupted transmission of forces in the area of the rim well. The rim well-forming fiber layers are preferably represented by a certain number of fiber layers following each other and being located radially on the outside, including the radially outermost ones.

The rim well-forming fiber layers are oriented, exactly in the same way as the flange-forming fiber layers outside the protuberances, in some sections preferably with approximately constant distance from the rotation symmetry axis, aside from the areas of the wheel flanges, hump or bead seats. This orientation advantageously makes it possible to form a high-strength fiber-reinforced rim well. The flange-forming fiber layers are especially preferably oriented in the radial direction of the rim well within the inwardly directed protuberances. Optimal introduction of the forces transmitted from the wheel hub via the wheel disk into the flange is made possible hereby. There is correspondingly a transition of the orientation of the flange-forming fiber layers on entry into the flange area. This guarantees at the same time the high-strength connection of the flange to the rim well as well as optimal introduction of the forces transmitted to the flange into the rim well and vice versa.

As far as the orientation of the fibers within the individual fiber layers is concerned, this may vary between different fiber layers. The fibers in the rim well-forming fiber layers preferably have a different angle in relation to the axial direction of the rim well than the fibers of the flange-forming layer. The orientation of the fibers of the rim well-forming fiber layers is determined above all by the desired mechanical properties of the rim well. The orientation of the fibers of the flange-forming fiber layers is used to provide a high-strength flange with optimal transmission of forces to the rim well.

It is also preferred to adapt the course of the fibers in the individual layers of the rim well according to the present invention corresponding to the expected mechanical stresses. The adaptation is performed primarily by setting the fiber orientation by adapting the layer thickness as well as optionally by introducing additional textile inlays between the fiber layers at the sites at which especially high stress is to be expected.

The fibers of the flange-forming fiber layers have a fiber angle of $\pm 3°$ to $\pm 87°$, preferably $\pm 15°$ to $\pm 65°$ and more preferably $\pm 20°$ to $\pm 60°$ relative to the axial direction of the rim well. When semifinished textile products are used, the fibers may also have angles of $\pm 0°$ to $\pm 90°$ and preferably $\pm 3°$ to $\pm 87°$. The higher fiber angles are especially to be preferred, because fiber layers consisting of fibers having such an orientation could readily form a flange of any desired shape. However, there may disadvantageously be a non-uniform fiber distribution in the area of the flange, especially in the entry and exit areas of the fibers, in case of excessively great fiber angles.

The fibers of the rim well-forming fiber layers have a fiber angle of $\pm 3°$ to $\pm 87°$, preferably $\pm 20°$ to $\pm 75°$ and more preferably $\pm 30°$ to $\pm 70°$ relative to the axial direction of the rim well. When semifinished textile products are used, the fibers may also have angles of $\pm 0°$ to $\pm 90°$ and preferably $\pm 3°$ to $\pm 87°$. The transmission of torques from the hub to the tires stresses the rims less than shear stresses and bending stresses while driving in curves or impact stresses in case of potholes or shock-like stresses, as in the case of the rim impacting the edge of a curbstone. These pulse-like stresses can be transmitted especially well due to a fiber orientation nearly in parallel to the axial direction of the rim well and dissipated to the hub or wheel suspension. The orientation of the fibers within the rim well-forming fiber layers that is preferred according to the present invention is therefore a compromise concerning the diversity of the stresses acting on a vehicle wheel. An even better stability of the rim is preferably achieved by the fibers of different fiber layers have mutually deviating orientations.

Furthermore, the flange preferably has inlays in the inwardly directed protuberances of the fiber layers. These inlays are likewise arranged as a broken circular ring, i.e., they are nearly continuous with one or more interruptions, or as individual ring segments. Mechanical reinforcement of the entire flange or of individual areas, e.g., at the points at which the wheel spider will be later arranged, can thus be advantageously achieved. The inlays preferably have threaded sleeves or bushes, which are used for the subsequent fastening of the wheel disk or of the wheel spider, for example, by screw connection. The fastening can be performed especially advantageously by recessing the fastening means in the inlay, so that these will not protrude from the flange on both sides. The fastening of the wheel disk or of the wheel spider can thus be advantageously performed without fastening means being visible from the outside. The inlays preferably consist of plastic, foam, consolidated fiber composite, matrix material or metallic materials.

The flange preferably has a rectangular cross-sectional geometry with straight flanks or a U-shaped or V-shaped geometry with oblique flanks. The flanks may have both an essentially radial orientation or even an orientation deviating therefrom, for example, they may be sloped slightly inwardly or outwardly. In principle, a plurality of cross-sectional geometries is conceivable, and the flank is preferably shaped as an ideally shaped counterpart to mounting elements located on the wheel disk or wheel spider. The edges of the flange are preferably rounded in order to improve the mechanical properties of the rim well, especially in terms of the notch effect, and in order to minimize the risk of injury due to sharp edges. In another preferred embodiment, the cross-sectional geometry of the flange varies along the circumference of the flange in order to be adapted, for example, to the differently shaped mounting elements of individual hollow spokes.

The present invention also pertains to a method for manufacturing a rim well with integrated flange from fiber composite.

A mold corresponding to the contour of the rim well to be manufactured, which is provided with a circumferential or segmented radial groove, is used according to the present invention. Fiber material is deposited on this mold such that the fibers are deposited in a positive-locking manner on the mold and the fibers of at least one fiber layer enter the groove without interruption. A preform of the rim well is thus formed, which has at least one fiber layer with inwardly directed protuberances. The fibers are deposited in a positive-locking manner on the mold especially preferably such that the fibers of at least one fiber layer enter and again exit the groove without interruption. The rim well according to the present invention is produced by a subsequent consolidation of the preform by infiltration of a matrix material and pressing in a suitable outer tool. The high-strength flange according to the present invention, bonded directly to the rim well, is formed by the consolidation of the protuberance of at least one fiber layer.

The deposition of the fiber material on the mold is carried out in the process according to the present invention by means of draping multiaxial scrims, scrim blanks or fabric layers on the mold, by winding tape braid or flattened round braid around the mold and/or by braiding the mold with braided filaments.

Deposition of the fiber material or the manufacture of the preform by braiding around the mold by means of a radial braiding machine is especially preferred. The mold as a braiding core is covered here with the desired number of fiber layers consisting of continuous filaments by moving it several times forward and backward through the coaxial braiding machine. The tension of the filaments of the braided fibers is adapted now such that these are deposited on the mold in a positive-locking manner. Furthermore, it is possible to set the angle of the braided filaments as well as to tie in filler yarns extending in the axial direction. Due to this, as well as due to the specific setting of the reversal points of the forward and backward motion, preforms with locally varying properties, especially fiber orientation and braid thickness, can be produced in a specific manner. Rim wells with a fiber orientation adapted to the mechanical and thermal stresses to be expected can be manufactured by consolidation from these preforms.

When braiding or winding around the mold, the filament tension is set such that the continuous filaments of the fiber material of at least one fiber layer enter and exit the groove without interruption when this groove is being braided over. A braided body, which has at least one fiber layer with a protuberance directed inwardly into the groove, is deposited as a result on the mold. The setting of the filament tension makes it possible to control the flank angle of this protuberance, with a higher filament tension leading, as a function of the deposition angle, as a rule to a protuberance with steeper flank angle and a lower filament tension to a protuberance with flatter flank angle. Nevertheless, fibers cannot be deposited by braiding technique on a rectangular groove such that they will be fully in contact with the inner contour of the groove even with high filament tensions; a groove with oblique flanks, for example, a wedge-shaped groove, is required for this. In addition, a lower filament tension, which makes it possible to form a filament reserve forming the protuberance, may also be advantageous when depositing fibers with a very small angle in relation to the axial direction. The filaments are tensioned in the method according to the present invention with a force of 0.7 N to 9 N, preferably with a force of 1 N to 7 N, and especially preferably with a force of 2 N to 5 N.

Besides the filament tension, the angle at which the fibers are deposited during the braiding or winding around of the mold for forming the flange is significant as well. The deposition of the fibers in the axial direction of the rim well would cause the formation of sufficiently large protuberances to be problematic even in case of high filament tensions. By contrast, braiding or winding around could be performed with very high filament tensions in case of deposition of the continuous filament at right angles to the axial direction of the rim well, because the continuous filaments could be deposited without problems in the circumferential groove. However, the filament could slip off now precisely in the edge area of the flange, which results in non-uniform fiber distribution in the area of the flange. A suitable combination of filament tension and deposition angle, with which sufficiently large flanges with uniform fiber distribution can be formed, must therefore be selected in the process according to the present invention.

The mold (mold element) used in the method according to the present invention is preferably a multipart mold, whose individual mold parts are axially displaceable in relation to one another. The radially circumferential or segmented groove is formed now especially preferably by a recess defined in the axial and radial directions between the mold parts, whose width can be set by axially displacing the mold parts in relation to one another.

A multipart mold, which has a radial pitch with a recess located therein with a nearly rectangular cross-sectional shape or with flanks directed inwardly nearly at right angles, is used in a preferred embodiment of the method. When using such a mold, the deposition of one or more fiber layers over the recess leads at first to these forming one or more inwardly directed protuberances, which span over the groove in a wedge-shaped manner and are only partly in contact with the inner contour of the groove.

The width of the recess is preferably also adjustable by an axial displacement of the mold parts of the multipart mold. Due to the axial displacement of the mold parts of the multipart mold, which displacement follows the fiber deposition, the width of the recess or groove is subsequently reduced, as a result of which the protuberances located therein are deformed, similarly to what happens during drop-forging. The protuberances are advantageously fully in contact with the inner contour of the now narrowed groove and in a positive-locking manner after the deformation. The protuberances are thus advantageously brought by the axial displacement of the mold parts to a shape of the flange that is close to the final contour. The continuous filaments are especially advantageously oriented in the approximately radial direction of the rim well in the area of the protuberances after the deformation. Due to the continuous transition of the orientation of these fibers to the orientation of the fibers forming the rim well along the circumference of the rim well, both of the radially inner layer and of the radially outer layer, optimal introduction and transmission of forces is made possible hereby between the rim well and the wheel disk or the wheel spider.

A multipart mold with a recess with a nearly wedge-shaped cross-sectional shape or with obliquely inwardly directed flanks is used in a likewise preferred embodiment of the method. When such a mold is used, the deposition of one of more fiber layers over the recess causes said recess to form one or more inwardly directed protuberances, which are fully in contact with the inner contour of the recess. Since the fiber layers fully follow the course of the mold including the recess, the protuberances have a depression corresponding to the inner contour of the recess on their surface. In an especially preferred embodiment, this depression is eliminated by the embedding of inlays, which are adapted to the inner contour of the recess. These inlays may be both in the form of a broken circular ring, for example, as a snap ring, or as individual circle segments.

The mold used in the method according to the present invention additionally preferably has circle segments, which are located in the recess located between the individual mold parts. The dimensions of the recess are then determined by the axially displaceable mold parts of the mold in the axial direction and by the contour of the radially displaceable circle segments in the radial direction. The width of the recess can thus be set by axial displacement of the mold parts and the height by radial displacement of the circle segments. Furthermore, the circle segments may be removed from the recess when this is widened by axial displacement of the mold parts. If the circle segments are removed from the recess, the shape and dimension of the recess will again be determined by the mold parts alone. The circle segments are also preferably secured in the recess located between the mold parts by axially displaceable sliding parts. As a result, it is thus also possible to remove the circle segments without increasing the width of the recess, simply by unlocking the sliding parts. The sliding parts are, moreover, preferably shaped such that the dimension of the recess and hence the deformation of the protuberances close to the final contour can be determined by the fixation of these sliding parts on the outer side of one of the mold parts.

Circle segments with a nearly wedge-shaped surface contour or flanks extending in a wedge-shaped manner are located in the recess in another preferred embodiment of the method according to the present invention. The deposition of one or more fiber layers over the recess and circle segments causes these to form one or more protuberances, which are fully in contact with the inner contour of the circle segments. The circle segments are then removed, either by increasing the width of the recess by axial displacement of the mold parts or by releasing the locking of the circle segments by axial displacement of the sliding parts. If the circle segments are removed, the width of the recess is reduced by axial displacement of the mold parts and the protuberances located therein are deformed. The protuberances are advantageously fully in contact with the inner contour of the narrowed recess in a positive-locking manner after the deformation.

A flange with especially homogeneous fiber distribution and with very high volumetric fiber content is obtained after the consolidation due to the controlled deposition of the fibers on the surface of the circle segments as well as the subsequent deformation of the protuberances to close to the final contour. The volumetric fiber content of the flange of the rim well according to the present invention equals at least 40%, especially preferably at least 50% and more, and preferably at least 60% and more and especially preferably 90%. As a result, the flange advantageously possesses especially homogeneous properties in terms of mechanical or thermal stresses and especially few weak points or imperfections. The positive-locking deposition of the fibers on the surface of the circle segments makes it possible, together with the deformation of the protuberances, especially advantageously to set the fiber orientation especially accurately in the flange as well as in the transition area of the flange to the rim well.

Circle segments with a nearly flat inner contour are located in the recess in another preferred embodiment of the method according to the present invention. The deposition of one or more fiber layers over the recess and circle segments causes these fiber layers to be fully in contact with the flat surface of the circle segments, which surface is flush with the rest of the rim well. The circle segments are then removed, either by increasing the recess or preferably by unlocking by means of axial displacement of the sliding parts. The fiber layers now extending flatly over the recess are then pressed into the widened recess by means of punch segments. The width of the recess is reduced by an axial displacement of the mold parts in relation to one another and the width of the recess is subsequently reduced and the protuberances are deformed. The protuberances are advantageously fully in contact with the inner contour of the narrowed groove in a positive-locking manner after the deformation.

Also preferred is the combination of the deformation of the protuberances by axial displacement of the mold parts and the embedding of inlays in the protuberances. The embedding of the inlays may advantageously serve the purpose of tightening or aligning the flange-forming fiber layers in relation to one another before the deformation of the protuberances. In particular, the above-mentioned punch segments may remain in the protuberances as inlays after the fiber layers have been pressed into the protuberance.

More fiber layers are also preferably deposited on the rim well after narrowing the recess and deforming the protuberances or after embedding the inlays in the protuberances. Since the recess is completely filled now by the deformed protuberances of the fiber layers deposited previously or by fiber layers and inlays, the newly deposited fiber layers do not form any protuberances over the recess. As a result, these fiber layers preferably form a second layer, whose fiber layers are deposited in the area of the rim well only and whose continuous filaments do not enter the flange. As a result, they cover or span over the upwardly open protuberances of the first layer located radially under it, which leads to an improvement of the stability of the rim well. The mold is opened by axial displacement of the mold parts and the finished preform is removed after deposition of the second layer of rim-forming fiber layers.

Fiber layers, both flange-forming and rim well-forming fiber layers, are also preferably deposited in axially defined areas of the rim well. These fiber layers thus pass through the rim well only partly. The deposition of these fiber layers can be carried out by applying additional fiber layers in the form of textile patches, for example, scrim blanks or fabric tape. Also preferred is the deposition of such fiber layers formed from continuous filaments, for example, by braiding or winding around, by the setting of reversal pints at any desired sites of the rim well, especially at sites on both sides of the flange. Deposition of these additional fiber layers is preferred over and in the area close to the flange, both to form the flange (flange-forming fiber layers) and to span over the flange (rim well-forming fiber layers). The deposition of such fiber layers advantageously brings about a reduction of the notch effect in the area of the flange.

The consolidation of the preform is subsequently carried out preferably by means of preferably metallic and multipart outer tool. The consolidation of the preform is carried out especially preferably according to an RTM (Resin Transfer Molding) method. In any case, the outer tool has a chamber corresponding to the shape of the preform, into which the preform is inserted. Suitable matrix material is then injected into the outer tool containing the preform under a certain pressure and at a certain temperature. The preform is consolidated into the finished rim well with the curing of the matrix material.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a perspective view of the rim well according to the present invention with integrated flange;

FIG. 6 is a cross section of the rim well according to the present invention with integrated flange;

FIG. 7 is a cross section of the rim well according to the present invention with detail views of the flange;

DESCRIPTION OF THE PREFERRED EMBODIMENTS

Exemplary Embodiment 1

Figure 1:
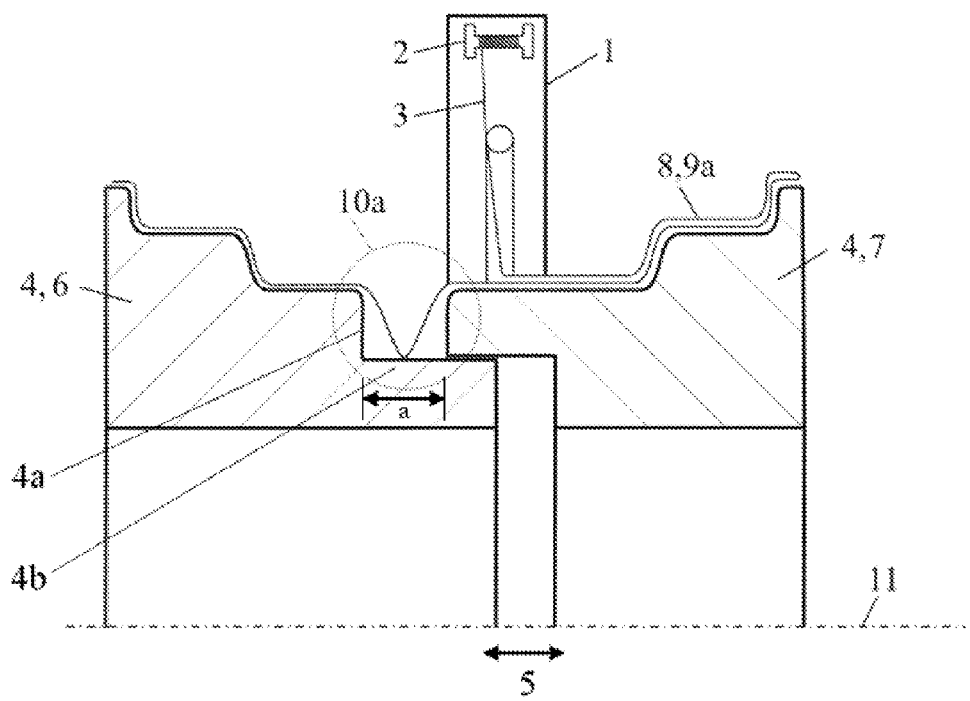
FIG. 1 is a sectional view showing the deposition of fiber layers on a multipart mold with enlarged recess by means of a radial braiding machine.

The multipart mold 4 shown in FIG. 1 has a first mold part 6 and a second mold part 7, which are axially displaceable in relation to one another. Between the two mold parts 6, 7, the mold has a radially extending rectangular recess 10a with the flanks 4a and with the bottom 4b. Corresponding to the axial position of the two mold parts 6, 7 displaceable along the direction of displacement 5, the recess 10a has a width a.

The mold 4 is used in the manufacture of a rim well according to the present invention as a braiding core of a radial braiding machine 1. The mold 4 is moved axially forward and backward along the rotation symmetry axis 11 through this machine 1, while braided filaments 3, rolled off from radial braiding bobbins 2 directed towards the braiding point, are deposited on the mold 4. Due to the mutually crossing motion of the bobbins 2 along two sinusoidal bobbin paths, the braided filaments 3 running from the bobbins 2 to the mold 4 mutually cross and intersect each other. A positive-locking fiber braiding 8 is deposited as a result on the braiding core, and individual fiber layers are deposited each during a forward or return motion of the mold 4.

Figure 2:
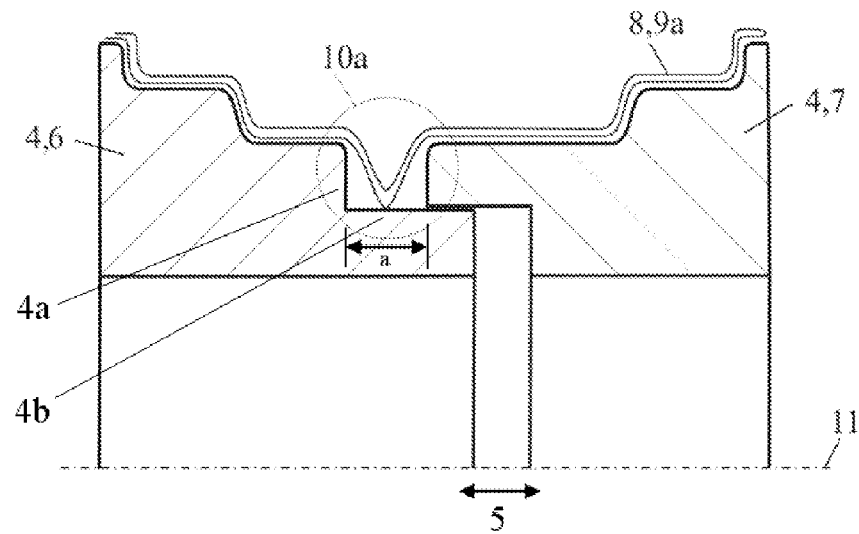
FIG. 2 is a sectional view showing a first layer of flange-forming fiber layers with inwardly directed protuberances on a multipart mold with enlarged recess.

Due to the fact that the opened recess 10a is braided over during a complete forward and return motion of the mold 4 by the radial braiding machine 1, the two flange-forming fiber layers 9a shown in FIG. 2 are deposited on the mold 4 with a fiber angle of ±80° relative to the axial direction. These fiber layers 9a span over the recess 10a in a wedge-shaped manner and are in contact only partly at their bottom 4b but not at the flanks 4a, whereas they are in contact with the mold 5 in a positive-locking manner in the area of the rest of the rim well. Since the two deposited fiber layers 9a consist of continuous filaments, the fiber layers have two reversal points, one at the right wheel flange of the rim well and one within the rectangular recess 10a, and the fiber layers 9a are connected to one another at the reversal points at the wheel flanges.

Figure 3:
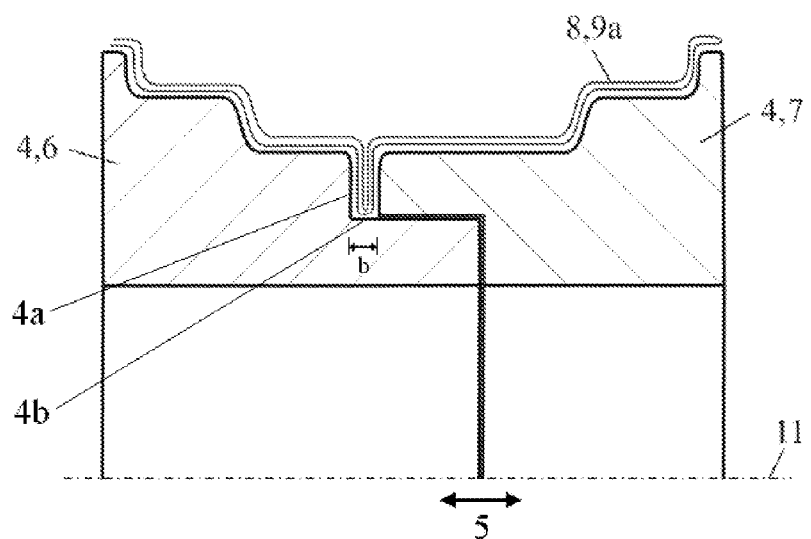
FIG. 3 is a sectional view showing first layer of flange-forming fiber layers with deformed protuberances on a multipart mold with reduced recess.

The width of the recess 10a is reduced in FIG. 3 by axial displacement of the mold parts 6, 7 along the direction of displacement 5 to the width b. The flange-forming fiber layers 9a spanning over this recess in a wedge-shaped manner are deformed hereby. The width b of the reduced recess and thus the degree of compaction or the later fiber-to-matrix ratio of the fiber layers 9a is determined by a positive-locking connection of the mold parts 6, 7 and the lower area of these mold parts. These fiber layers 9a are now also in contact with the flanks 4a and the bottom 4b in the recess in a positive-locking manner and image the recess or flange close to the final contour.

Figure 4:
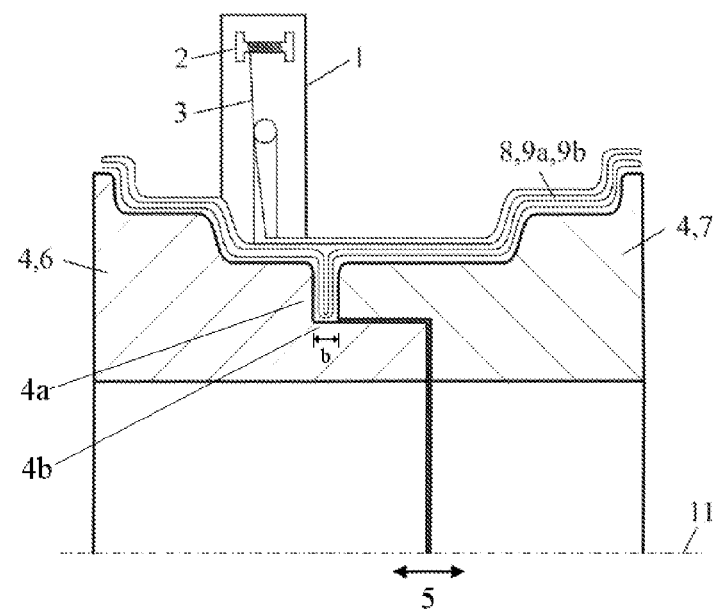
FIG. 4 is a sectional view showing the deposition of a second rim-forming layer of fiber layers without inwardly directed protuberances on a multipart mold with reduced recess and with flange-forming fiber layers deposited thereon with deformed protuberances located in the recess.

As is shown in FIG. 4, the mold with the recess reduced to the width b and with the fiber layers 9a, which are deposited thereon as well as deformed, are braided over again. The rim well-forming fiber layers 9a are deposited on the mold 5 in a positive-locking manner with a fiber angle of ±80° relative to the axial direction due to repeated complete forward and return motion of the braiding core 4 along the rotation symmetry axis 11 by the radial braiding machine. These fiber layers 9a now span over the deformed fiber layers 9a and thus ensure increased stability of the rim well.

A multipart metallic outer tool is subsequently used in the area of the rim well for pressing during infiltration and consolidation. This results in the rim well according to the present invention with integrated high-strength flange, which is shown in a perspective view in FIG. 5 and in a sectional view in FIG. 6. A detailed view of the course of the fiber layer in the flange is shown in FIG. 7. FIG. 7A shows the course of continuous filaments that enter and then exit the flange without interruption of the fiber and have a reversal point at the lower end of the flange. Such continuous filaments can be preferably deposited on the mold in a braiding or winding process. FIG. 7A shows the course of fibers that enter the flange without fiber interruption. Such fiber layers are preferably formed by separate deposition of textile patches on the mold parts of the mold as well as by shifting into the groove and deformation by displacement of the mold parts.

Exemplary Embodiment 2

Figure 8:
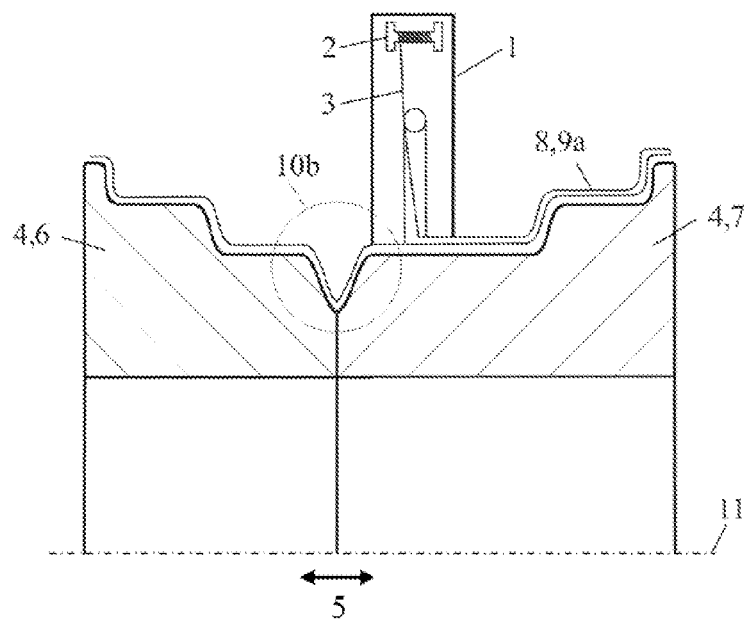
FIG. 8 is a sectional view showing the deposition of a first layer of flange-forming fiber layers with inwardly directed protuberances on a multipart mold with fixed recess by means of a radial braiding machine.
Figure 9:
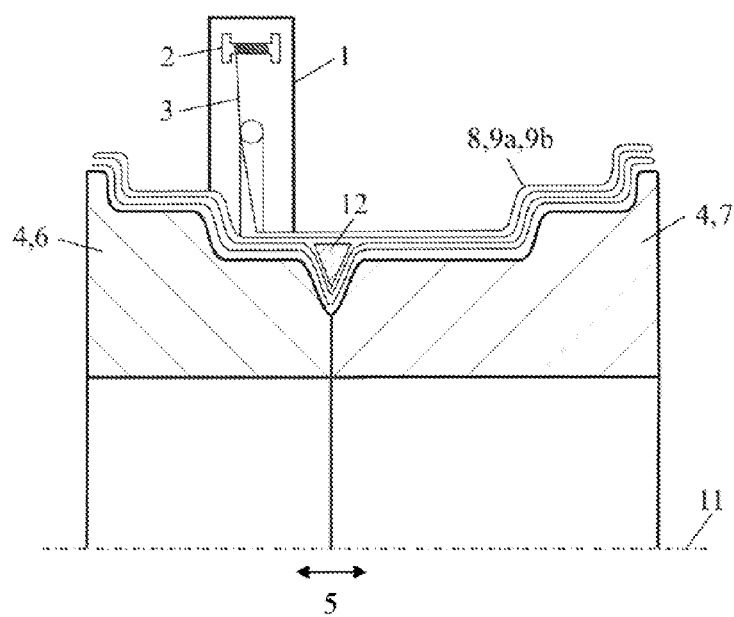
FIG. 9 is a sectional view showing the deposition of a second layer of rim-forming fiber layers without inwardly directed protuberances on a first layer of fiber layers with inlay integrated in the protuberances of said fiber layer.

The deposition of the flange-forming fiber layers 9a is carried out on a mold comprising two mold parts 6, 7, which is shown in FIG. 8 and has a V-shaped recess 10b of fixed width, wherein the fibers of the fiber layers 9a are fully in contact with the inner contour thereof mold parts. As is shown in FIG. 9, V-shaped inlays 12 are integrated in the inwardly directed protuberances of the fiber layers 9a, which protuberances correspond to the contour of the recess 10b, after the positive-locking deposition of the fiber layers 9a on the mold 4. As a result, these fiber layers 9a are advantageously pressed farther onto the surface of the recess 10c of the mold 4. Furthermore, the surface of the inlay 12 is advantageously flush with the surface of the fiber layers 9a in the area of the rim well. The deposition of the rim well-forming fiber layers 9a on the fiber layers 9a as well as of the inlays 12 embedded in said fiber layers is subsequently carried out.

Figure 10:
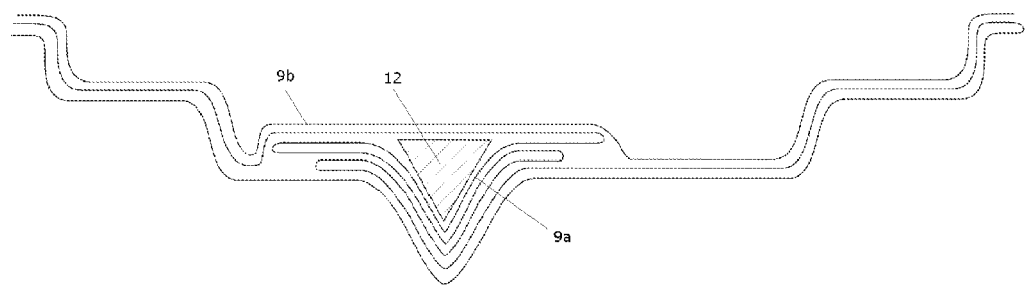
FIG. 10 is a sectional view showing the deposition of both rim well-forming and flange-forming fiber layers with reversal points in the area of the rim well, especially in the area close to the flange.

As is shown in FIG. 10, it is additionally possible to deposit flange-forming and rim well-forming layers 9a as well as rim well-forming layers 9b with reversal points in the area of the rim well, especially in the area in the vicinity of the flange. As a result, the flange area is braided over more often and additional braiding layers are deposited compared to the rest of the rim well. An additional reinforcement of the flange area is advantageously achieved hereby. The layers not extending over the entire rim well in the radial orientation can be both deformed to form a flange (9a) and deposited on the flange and on the flange-forming layers after embedding the inlay 12.

The mold parts 6, 7 are then displaced axially in relation to one another and the preform is removed. The consolidation of the preform is carried out in a multipart metallic outer tool, while the inlays 12 consisting of foam are used for pressing the flange area during infiltration and consolidation and will then remain in the component.

Exemplary Embodiment 3

Figure 11:
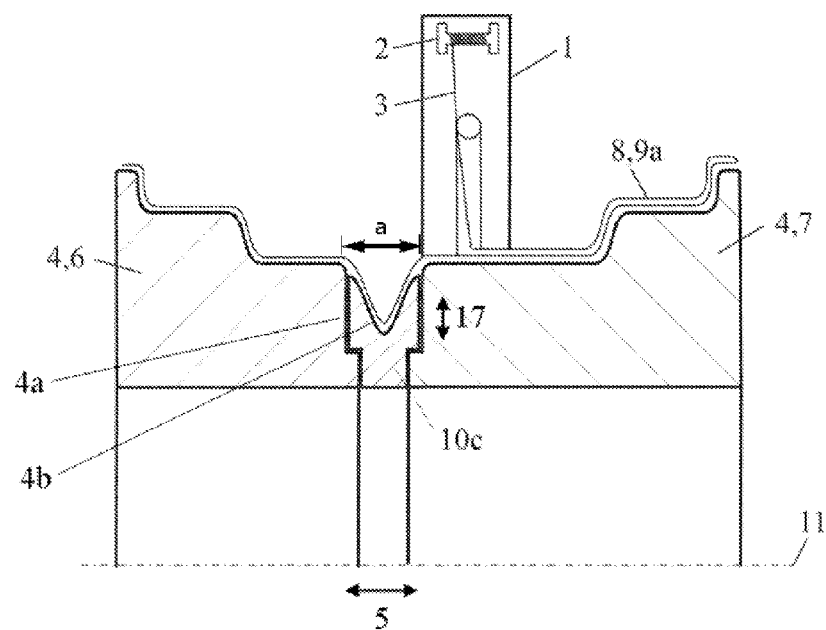
FIG. 11 is a sectional view showing the deposition of a first layer of flange-forming fiber layers with inwardly directed protuberances on a multipart mold with enlarged recess and circle segments located therein by means of a radial braiding machine.

The multipart mold 4 shown in FIG. 11 comprises two mold parts 6, 7, which are displaceable axially in relation to one another in the direction of displacement 5 and form a rectangular recess with straight flanks and with a width a=50 mm. V-shaped ring segments 10c, whose outer contour is in contact with the flanks 4a of the recess in a positive-locking manner and whose bottom 4b determines the inner contour of the recess, are integrated in this recess. The flange-forming fiber layers 9a are deposited on the bottom 4b of the V-shaped ring segments 10c in a positive-locking manner by depositing braided filaments 3 on the mold 4 according to the braiding technique. The fiber layers span over the area of the recess in a wedge-shaped pattern and are thus fully in contact with the bottom 4b of the ring segments 10c. Due to the fact that the fiber layers 9a are deposited in a positive-locking manner in the area of the recess as well, the filament tension and filament angle of the braided filaments 3 can be advantageously controlled more accurately.

Figure 12:
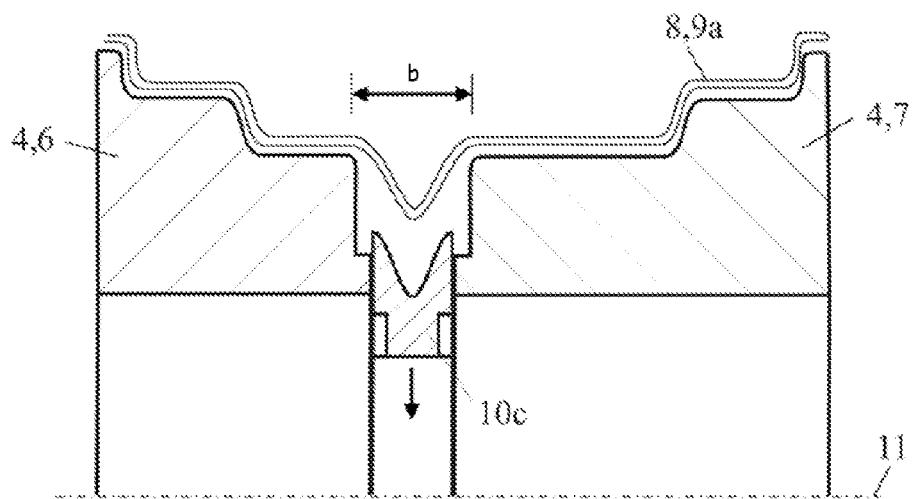
FIG. 12 is a sectional view showing the radial removal of the circle segments from the recess enlarged by axial displacement of the mold parts.
Figure 13:
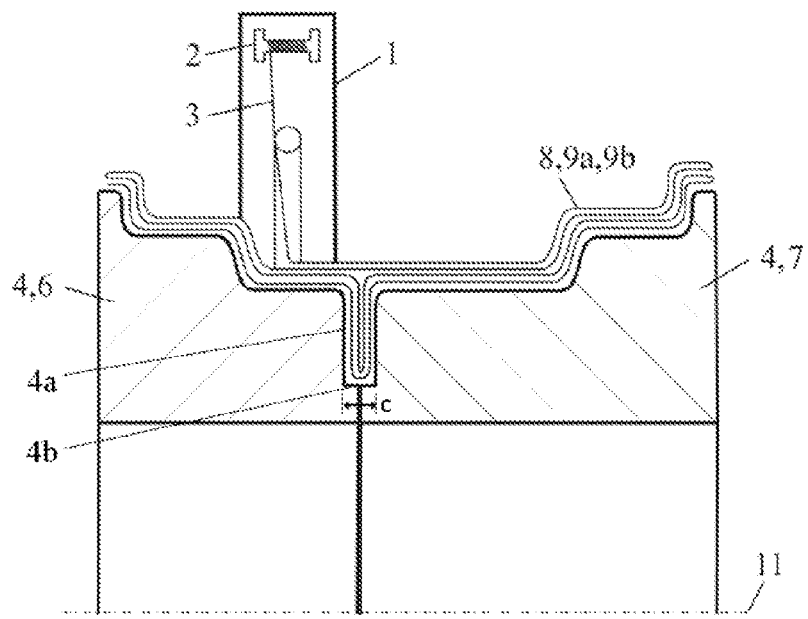
FIG. 13 is a sectional view showing the deposition of a second rim-forming layer of fiber layers without inwardly directed protuberances on a multipart mold with reduced recess and with flange-forming fiber layers deposited thereon with deformed protuberances located in the recess.

After the first two braided layers have been applied, the mold parts 6, 7 are opened to the width b>50 mm, as is shown in FIG. 12, so that the ring segments 10c can be displaced radially inwardly and thus removed one by one. As is shown in FIG. 13, this makes it possible to close the mold parts when reducing the width of the recess to the width c=10 mm. The protuberances of the flange-forming fiber layers 9a are deformed hereby. The fiber layers 9a are pressed by the deformation onto the flanks 4a and the bottom 4b of the recess formed by the mold parts 6, 7 in a positive-locking manner and are thus shaped to a shape close to the final contour of the flange. The fiber layers 9a are arranged properly in the flange area even after the deformation due to the controlled deposition of the fiber layers 9a on the surface of the circle segments 10c.

The mold is braided over again subsequently and fiber layers 9a are formed with the rim well-forming fiber layers 9b. A multipart outer tool is used in the area of the rim well for pressing during infiltration and consolidation.

Exemplary Embodiment 4

Figure 14:
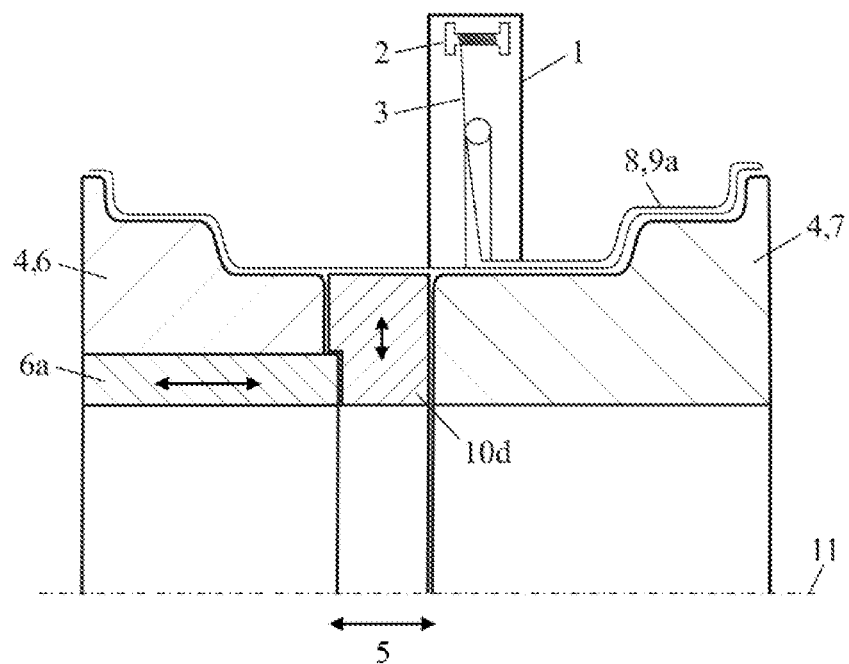
FIG. 14 is a sectional view showing the deposition of a first layer of flange-forming fiber layers with inwardly directed protuberances on a multipart mold with enlarged recess and with circle segments located therein and with sliding parts by means of a radial braiding machine.
Figure 15:
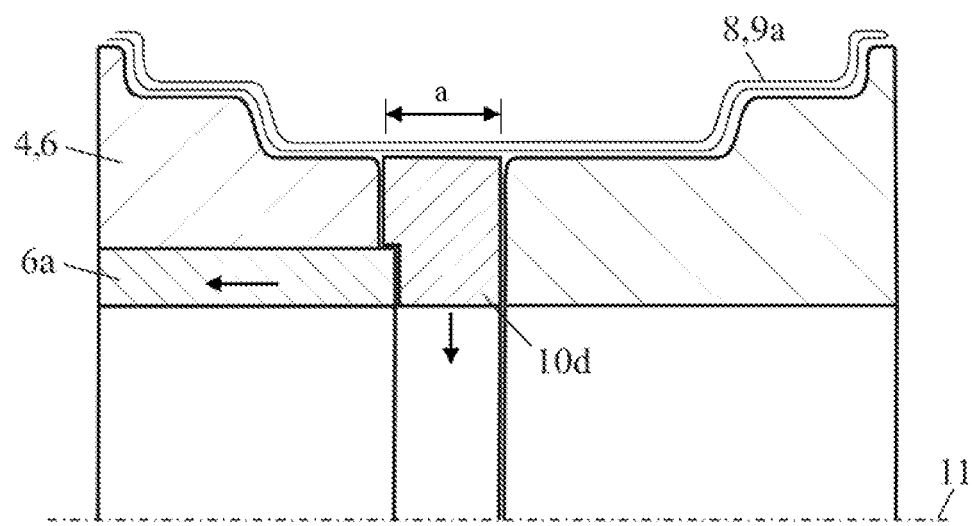
FIG. 15 is a sectional view showing the first layer of flange-forming fiber layers without inwardly directed protuberances on a multipart mold with widened recess and with circle segments located therein and with sliding parts.

The mold 4 shown in FIG. 14 has a rectangular recess with the width a with straight flanks between the two mold parts 6, 7. Rectangular ring segments 10d, which are radially fixed by a sliding part 6a, are located in this recess. The rectangular ring segments are shaped such that their surface is just flush with the surface of the rest of the rim well. If the mold 4 is braided over with a radial braiding machine 1, the fiber layers 9a are deposited in the entire area of the rim well in a positive-locking manner, as is shown in FIG. 15.

Figure 16:
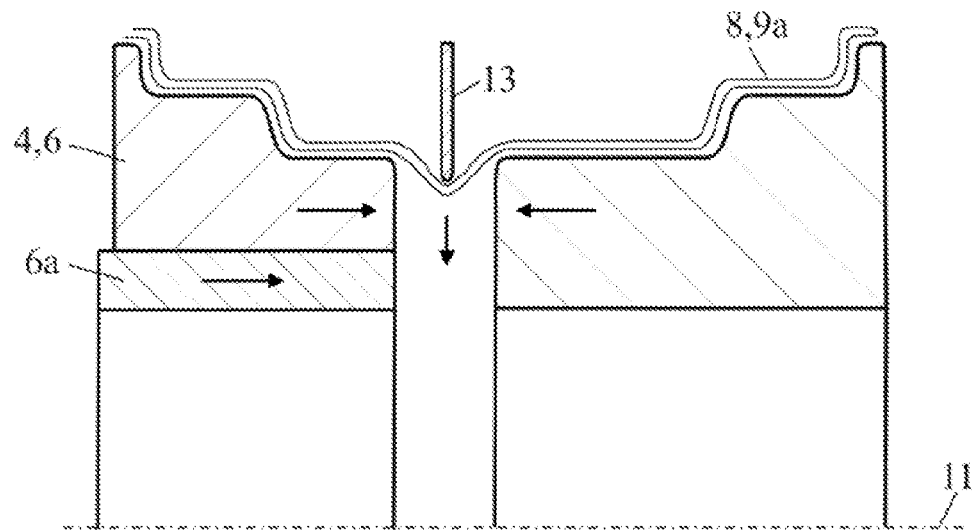
FIG. 16 is a sectional view showing the pressing of a first layer of flange-forming fiber layers into the enlarged recess of a multipart mold without circle segments located therein by means of punch segments.
Figure 17:
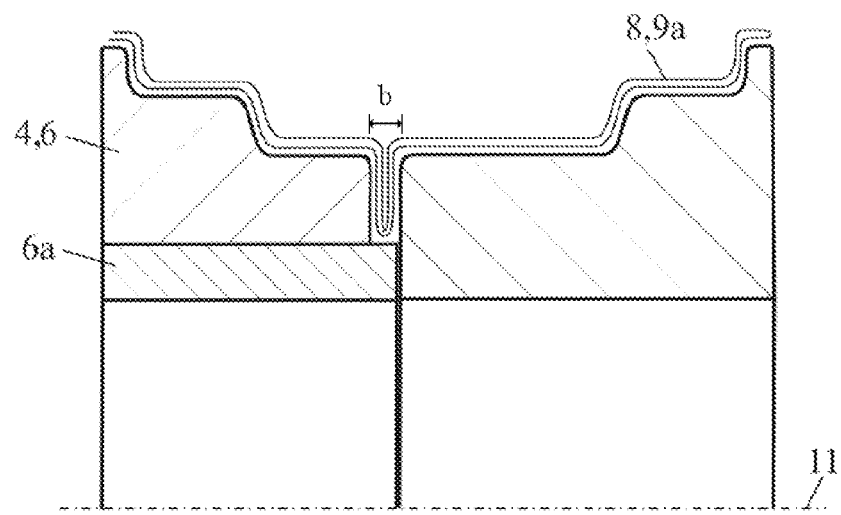
FIG. 17 is a sectional view showing a first layer of flange-forming fiber layers with deformed protuberances on a multipart mold with reduced recess.
Figure 18:
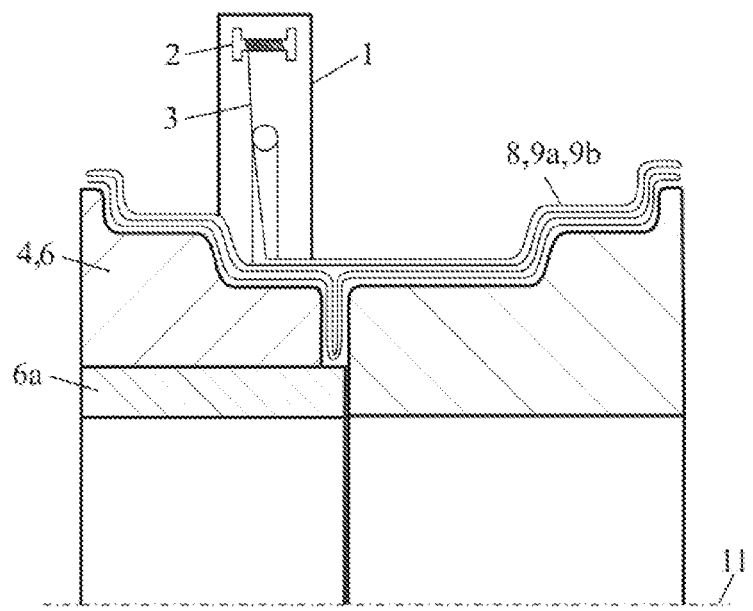
FIG. 18 is a sectional view showing the deposition of a second rim-forming layer of fiber layers without inwardly directed protuberances on a multipart mold with reduced recess and with flange-forming fiber layers deposited thereon with deformed protuberances located in the recess.
Figure 19:
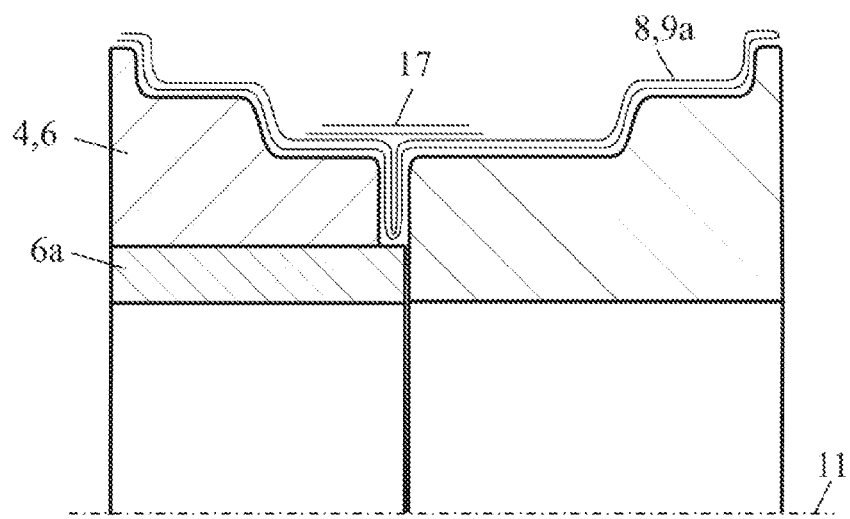
FIG. 19 is a sectional view showing a textile patch, deposited on a multipart mold with reduced recess and with flange-forming fiber layers deposited thereon with deformed protuberances located in the recess.

The locking of the circle segments 10c is released by an axial motion of the sliding part 6a and these circle segments can be removed from the recess without axial displacement of the mold parts 6, 7 (see arrows). The fiber layers 9a are pressed into the now opened recess by means of punch segments 13 (FIG. 16). Subsequently or at the same time, the mold parts 6, 7 are displaced axially, and the width of the recess is reduced thereby to the width b, and the fiber layers 9a are deformed. The sliding part 6a fixed on the outer side of the mold part 6 now defines at the same time the distance necessary for imaging the flange between the two mold parts 6, 7 (FIG. 17). After the punch segments 13 have been removed, the mold 5 with the fiber layers 9a deposited thereon is braided over again with the fiber layers 9b (FIG. 18). As is shown in FIG. 19, textile patches 17 are deposited in the area of the deformed protuberances in addition to the deposition of the rim well-forming fiber layers according to the braiding technique. In addition to the rim well-forming fiber layers, these reduce, the notch effect caused by the flange. A multipart metallic outer tool is used in the area of the rim well for pressing during infiltration and consolidation.

While specific embodiments of the invention have been shown and described in detail to illustrate the application of the principles of the invention, it will be understood that the invention may be embodied otherwise without departing from such principles.

The invention claimed is:

1. A rim well made of fiber composite, the rim well comprising:
a flange located on an inner side of the rim well for fastening a wheel spider or a wheel disk, wherein the flange is formed by inwardly directed protuberances of fiber layers of the rim well, wherein the fiber layers transition to the flange from the rim well without interruption.

2. A rim well made of fiber composite in accordance with claim 1, wherein the fiber layers transition to the flange and transition from the flange from the rim well without interruption and the lower end of the flange is formed by a reversal point of the fiber layers.

3. A rim well made of fiber composite in accordance with claim 1, wherein the fiber layers pass through the entire rim well as well as the entire flange without interruption.

4. A rim well made of fiber composite in accordance with claim 1, wherein some of the fiber layers pass only partly through the rim well in a manner that at least one fiber layer does not fully cover the rim well but passes through a part of the rim well starting from a point between the two wheel flanges in the direction of the center of the rim, wherein the fiber layer transitions to the flange at least without interruption, entering the flange and exiting the flange without interruption.

5. A rim well made of fiber composite in accordance with claim 1, wherein the fiber layers are formed from braided continuous filaments.

6. A rim well made of fiber composite in accordance with claim 1, wherein a layer of the fiber layers of the rim well, which layer is located radially inside, comprising at least one flange-forming fiber layer, has fibers that transition to the flange.

7. A rim well made of fiber composite in accordance with claim 1, wherein a layer of fiber layers of the rim well, which layer is located radially outside, comprising at least one rim well-forming fiber layer and textile patches applied additionally in the area of the protuberances having no fibers entering the flange.

8. A rim well made of fiber composite in accordance with claim 1, having at least two layers, which are arranged one on top of another in the radial direction of the rim well, wherein:
the fibers of the flange-forming fiber layers have an angle of ±3° to ±87° relative to the axial direction of the rim well; and
the fibers of the rim well-forming fiber layers have a fiber angle of ±3° to ±87°, relative to the axial direction of the rim well.

9. A rim well made of fiber composite in accordance with claim 1, comprising semifinished textile products with fiber orientations ranging from ±0° to ±90° relative to the axial direction of the rim well.

10. A rim well made of fiber composite in accordance with claim 1, wherein the flange is circumferential or is in the form of individual circle segments on the inner side of the rim well.

11. A rim well made of fiber composite in accordance with claim 1, wherein inlays in the form of a broken ring or individual circle segments are embedded in the protuberances of the flange.

12. A rim well made of fiber composite in accordance with claim 1, wherein the flange has a rectangular geometry with straight flanks or a V-shaped geometry with oblique flanks.

13. A rim well made of fiber composite in accordance with claim 1, wherein a layer of fiber layers of the rim well, which layer is located radially outside, or textile patches applied additionally in the area of the protuberances having no fibers entering the flange.

14. A rim well, comprising:
a rim well structure comprising fiber layers, a first rim well portion, a second rim well portion and a flange, said flange being located on an inner side of said rim well structure for fastening a wheel spider or a wheel disk, wherein a portion of said fiber layers extend continuously, without interruption, from said rim well first portion to said inner flange and another portion of said fiber layers extend continuously, without interruption, from said inner flange to said rim well second portion.

15. A rim well in accordance with claim 14, wherein said first rim well portion comprises a first rim well portion outer surface for engaging a portion of a tire, said second rim well portion comprising a second rim well portion outer surface for engaging another portion of the tire, wherein said first rim well portion, said second rim well portion and said flange are formed of said fiber layers.

16. A rim well in accordance with claim 15, wherein said flange extends in an inward direction, away from said first rim well portion and said second rim well portion, said fiber layers extending continuously, without interruption, from one side of said rim well structure to another side of said rim well structure.

17. A rim well in accordance with claim 14, wherein said fiber layers are formed from braided continuous filaments.

18. A rim well in accordance with claim 14, wherein said flange is circumferential or is in a form of individual circle segments on the inner side of the rim well.

19. A rim well, comprising:
a rim well structure formed of composite fiber, said composite fiber comprising fiber layers, said rim well structure comprising an inner side, a flange and an outer tire engaging surface for engaging a tire, said flange extending from said inner side in a direction away from said outer tire engaging surface for fastening a wheel disk or a wheel spider, said fiber layers extending continuously, without interruption, from one side of said rim well structure to another side of said rim well structure, wherein at least a portion of said fiber layers form said flange.

20. A rim well in accordance with claim 19, wherein said first rim well portion comprises a first rim well portion outer surface for engaging a portion of a tire, said second rim well portion comprising a second rim well portion outer surface for engaging another portion of the tire.

21. A rim well in accordance with claim 19, wherein said rim well structure comprises a first rim well portion and a second rim well portion, wherein a portion of said fiber layers extends continuously, without interruption, from an end portion of said rim well first portion to said inner flange and another portion of said fiber layers extends continuously, without interruption, from said inner flange to an end portion of said rim well second portion.

22. A rim well in accordance with claim 21, wherein said flange extends in an inward direction, away from said first rim well portion and said second rim well portion.

23. A rim well in accordance with claim 19, wherein said fiber layers are formed from braided continuous filaments, said flange being circumferential or said flange being in a form of individual circle segments on the inner side of the rim well structure.

* * * * *